United States Patent [19]

Loffreda

[11] 3,772,475

[45] Nov. 13, 1973

[54] SATELLITE COMMUNICATIONS SYSTEM WITH SUPER FRAME FORMAT AND FRAME SEGMENTED SIGNALLING

[75] Inventor: Albert Loffreda, Torino, Italy

[73] Assignee: Communications Satellite Corporation, Washington, D.C.

[22] Filed: Aug. 28, 1972

[21] Appl. No.: 284,004

[52] U.S. Cl. .............. 179/15 BS, 179/15 BY, 325/4

[58] Field of Search ................................ H04j/3/06; 179/15 BS, 15 AL, 15 BY; 178/69.5 R; 325/4

[56] References Cited

UNITED STATES PATENTS

| | | | |
|---|---|---|---|
| 3,662,114 | 5/1972 | Clark | 179/15 BS |
| 3,689,697 | 9/1972 | Smith | 179/15 BS |
| 3,529,089 | 9/1970 | Davis | 179/15 AL |
| 3,526,719 | 9/1970 | Puente | 179/15 BS |
| 3,513,264 | 5/1970 | Baer | 179/41 A |
| 3,320,611 | 5/1967 | Sekimoto | 325/4 |
| 3,532,985 | 10/1970 | Glomb | 325/4 |

*Primary Examiner*—Kathleen H. Claffy
*Assistant Examiner*—David L. Stewart
*Attorney*—Richard C. Sughrue et al.

[57] ABSTRACT

In a TDMA (time division multiple access) satellite communications system, the individual frames, comprising bursts from all participating Earth stations, are grouped in a super frame which comprises a fixed plurality of individual frames. The beginning of each super frame is identified by including super frame marker codes within the station bursts during the first frame of the super frame. The super frame marker for each station is time synchronized with the super frame marker of a reference station. Destination signalling is time divided throughout the super frame in accordance with a pre-assignment, thereby eliminating the requirement for accompanying signalling bits with a destination address code.

10 Claims, 5 Drawing Figures

TRANSMIT SIDE

RECEIVE SIDE

SATELLITE COMMUNICATIONS SYSTEM WITH SUPER FRAME FORMAT AND FRAME SEGMENTED SIGNALLING

BACKGROUND OF THE INVENTION

The invention is in the field of TDMA satellite communications system.

In a time division multiple access (TDMA) satellite communications system, a plurality of Earth stations are synchronized in time to share a satellite channel without any time overlap of the signals transmitted from the various Earth stations. The basic time format of the TDMA system is a frame, typically 125 μsec in duration, during which the satellite receives a burst of communication from each operating Earth station in a predetermined sequence, e.g. station A burst, followed by station B burst, followed by station C burst, etc.

Each station thus transmits a burst of communication every 125 μsec. However, the transmit times for bursts from the stations do not differ by the same time separation that said bursts have in the satellite because of the wide separation between Earth stations. For example, assume that the transit time between station A and the satellite is 15 milliseconds longer than the transit time between station B and the satellite. Also, assume that the frame format assignments require burst B to be received at the satellite 10 μsec after the start of burst A. Obviously, the desired time relationship between burst A and B cannot be achieved by transmitting burst B 10 μsec after the transmission of burst A. The differing transit times between the satellite and the respective Earth stations will cause the burst separation, when received at the satellite, to differ from the desired burst separation. Complicating the problem is the fact that even a synchronous satellite is not stationary. Thus, the difference in transit times between the satellite and stations A and B, respectively, will not remain constant.

Proper time synchronization of the bursts is achieved by a burst synchronization system of the type described and claimed in U.S. Pat. No. 3,562,432 which issued to Ova G. Gabbard on Feb. 9, 1971.

Station A, which may arbitrarily be designated as the reference station, transmits its burst every 125 μsec and all other stations are synchronized to the received station A burst. All of the other stations include the aforementioned burst synchronizer. Considering only station B, the burst synchronizer includes a delay counter which has a delay equal to the assigned time separation between the station A and station B bursts, e.g. 10 μsec. The station also includes a 125 μsec counter which initiates the start of transmission of burst B every 125 μsec. Each burst includes a code word (SAC) which identifies the transmitting station. When the burst from station A is received and the SAC for station A is detected, the delay counter begins counting down to zero, an operation which takes 10 μsec in the example being described. At this time the delay counter provides an output pulse to a time comparator. When the station B burst is received and the SAC for station B is detected, a second pulse is applied to the time comparator. Y, the station B burst, is in the proper position within the received frame, both pulses to the time comparator will arrive in coincidence and there will be no alteration of the 125 μsec counter. However, if the time comparator detects a time separation between the two input pulses, the 125 μsec counter will be advanced or retarded by one count to advance or retard the start of transmission of burst B. This known technique insures that the bursts from all the operating stations will not overlap in the satellite channel. Variations of the above technique are known also, but the explanation provided herein is considered sufficient to provide the necessary background information.

In a communications system of the type described, there are various operations which could be more easily carried out if performed at the same time. In the context used herein, the "same time" means the same time at the satellite. Examples are channel reallocation, signalling, equipment switch over, and other housekeeping functions. However, with present day burst synchronization systems it is not possible to know which of the transmitted bursts of station B will be in the same frame with any given burst from station A.

One of the operations that could be accomplished more easily if one knew which frame any given burst will enter is that of signalling. Signalling, as that term is used in communications arts, refers to the setting up or disconnecting of circuits. Each burst includes a preamble portion and a data portion, the latter portion being divided into channel slots, or half circuits. Since a satellite communications system is multi destinated, when it is desired to set up a circuit between station *i* and *j*, station *i* will insert a destination address in its preamble which identifies station *j* and informs station *j* that it wants to set up a call using time slot *x* of the station *i* burst. Station *j* responds by selecting a time slot in its burst for the return portion of the circuit.

The transmission of the destination codes can create problems. For example station *j* may detect its destination address and also its error detector may indicate an error in the received preamble. Not knowing for certain that the destination code is error free, station *j* will send out a request that station *i* repeat the message. The other stations will also send repeat requests to station *i*. Complications will therefore ensue.

SUMMARY OF THE INVENTION

In accordance with the present invention, means are provided to enable each station to keep track of the frames which its bursts will enter. A super frame is set up which has a duration on the order of the round trip time to the satellite, e.g. 300 milliseconds. The super frame comprises many normal frames, e.g. 2400 normal frames.

The reference station transmits a super frame reference in place of its normal SAC once every 2400 frames. The super frame reference may be the complement of the SAC. All of the other stations also replace their respective frame SAC's with super frame SAC's once every 2400 frames. As will be apparent, if all stations are super frame synchronized as well as burst synchronized, every 2400 frames, there will occur one frame in which all bursts include their respective super frame SAC's. This frame is considered to be the first frame of the super frame and its detection at any station starts a counter which counts the frames between 0 and 2,399, thereby keeping track of the received frames.

A separate counter at each station, also capable of counting between 0 and 2,399, keeps track of the frames for the transmitted bursts. Each time the transmitter counter reaches 0, the super frame SAC is included in the transmitted burst. If the transmitter counter of station B, for example, is properly synchronized, the burst of station B including the super frame SAC will appear in the same frame with the burst of station A including the super frame SAC. If this desired condition does not exist, the transmitter counter of station B is advanced or retarded to bring about the desired condition. With synchronism achieved, the transmitter counters of the respective stations provide the information about the frames which each burst will enter.

As an example, if it is desired to have an equipment switchover at each ground station take place during the same frame, e.g. frame 30, this could be accomplished at each individual station by switching over when the transmitter counter reads 29. The result will be that all bursts in frame 30 will reflect the equipment switchover for the first time.

The super frame particularly lends itself to solving the signalling problem mentioned above. Basically, the solution is to eliminate the destination addresses and assign portions of the super frame for signalling each station individually. For example, assuming there are 30 stations in the system, the super frame can be divided into 30 equal parts of 10 milliseconds (80 regular frames). These subdivisions are referred to hereinafter as master frames. During the first 80 frames, all stations can send signalling data only to station A; during the second 80 frames, all stations can send signalling data only to station B; etc.

DETAILED DESCRIPTION OF THE PREFERRED EMBODIMENT

Figure 3:
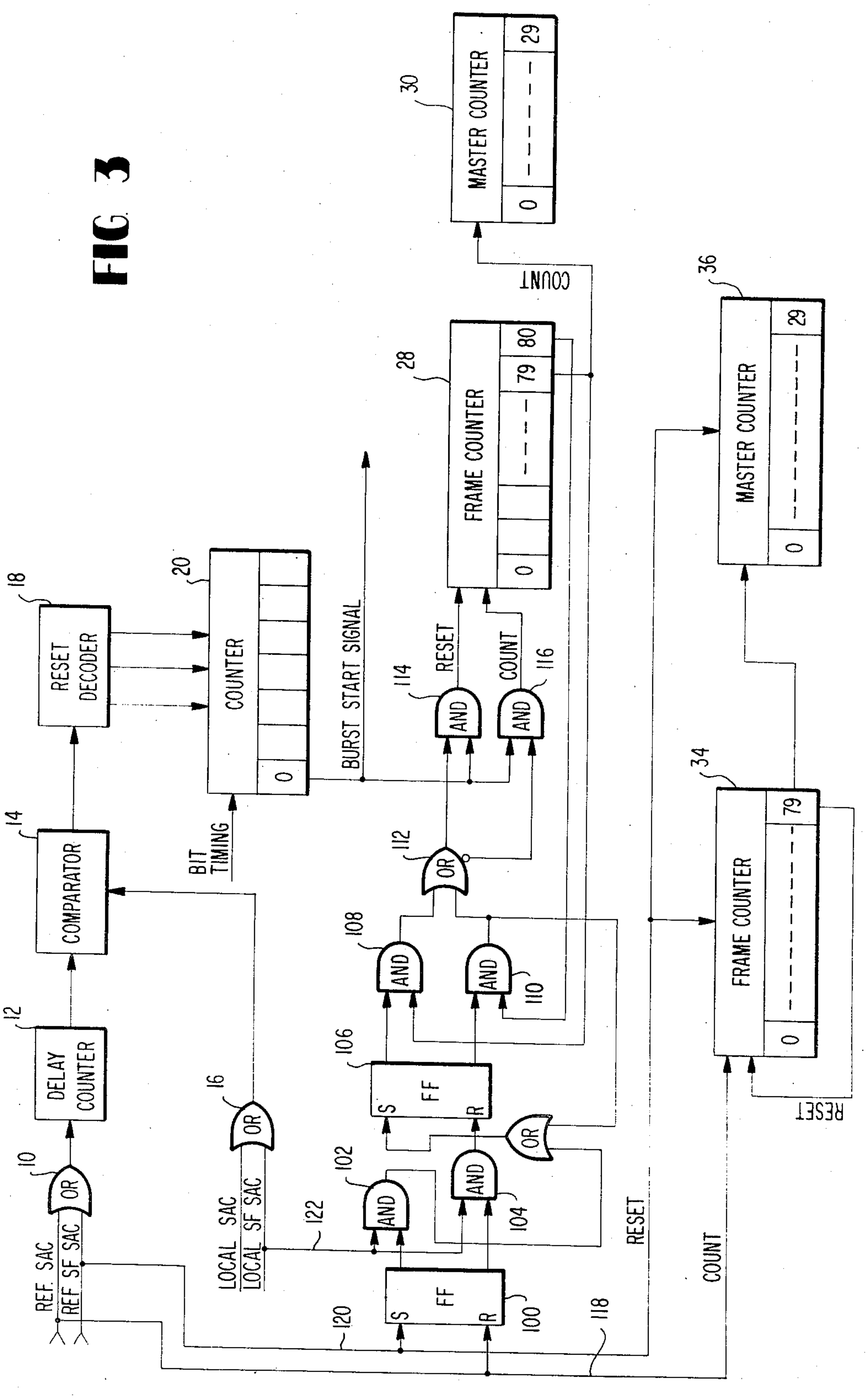
FIG. 3, is a block diagram of the burst and frame synchronization portions of an Earth station in accordance with the present invention.
Figure 4:
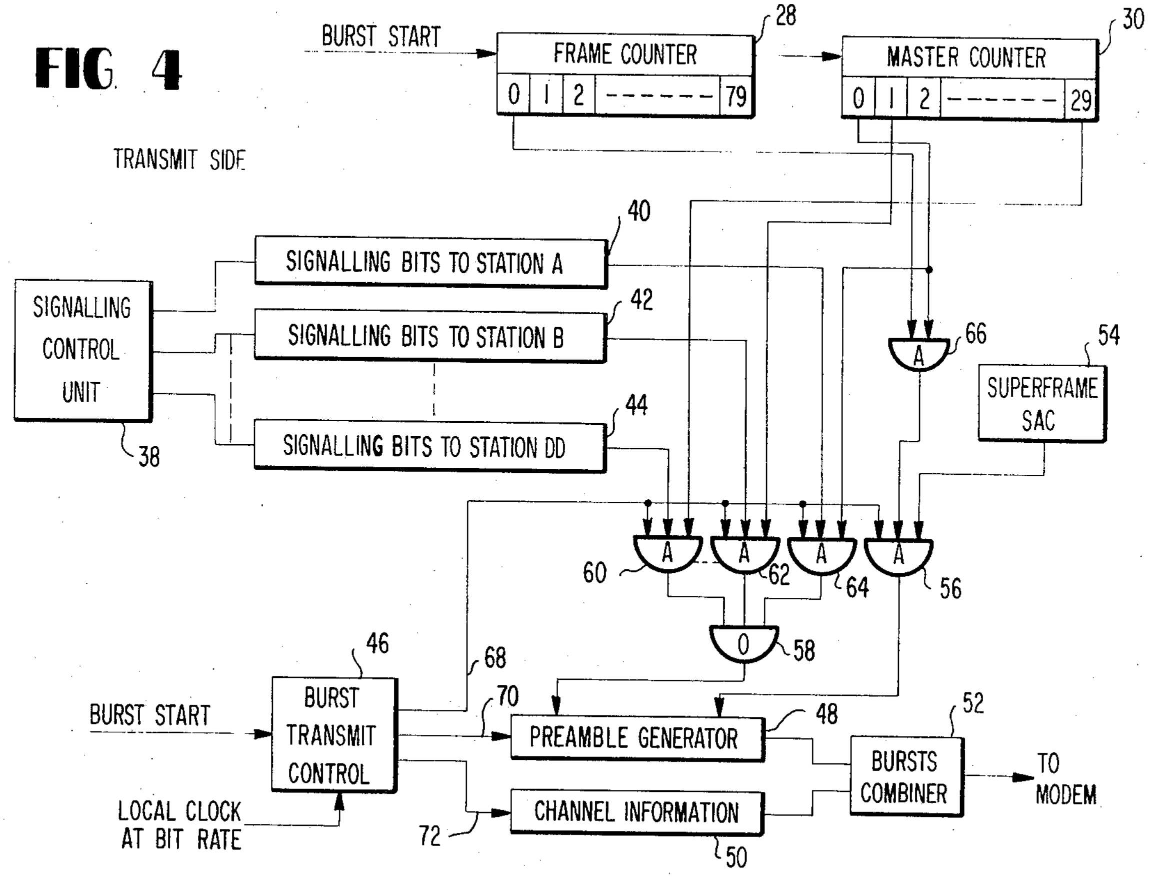
FIG. 4 is a block diagram of the transmit portion of an Earth station in accordance with the present invention.
Figure 5:
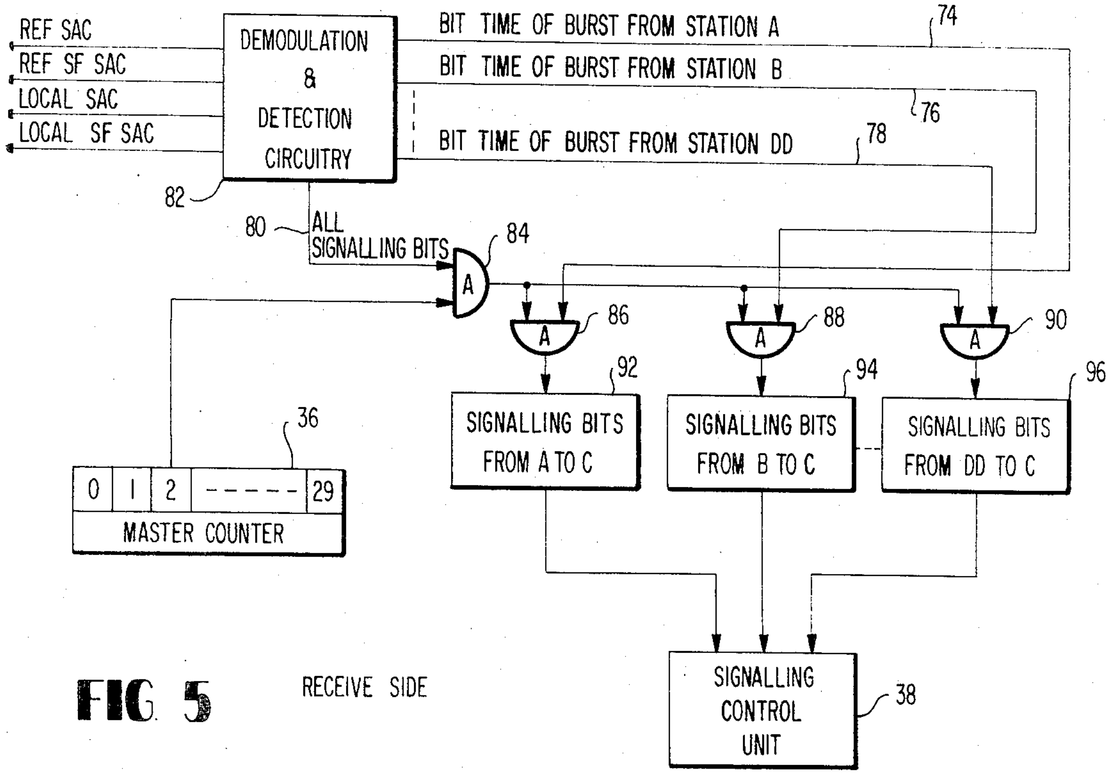
FIG. 5 is a block diagram of the receive portion of an Earth station in accordance with the present invention.

In the drawings, particularly FIGS. 3 through 5, all of the individual elements shown in block form comprises conventional apparatus known in the art. The elements shown are for a single Earth station but it should be understood that the same combination of elements will be located at each of the participating Earth stations. However, the station which operates as the reference station need not include the synchronization apparatus since all other stations synchronize their respective bursts and super frame marker to the reference burst and marker. Also, only those elements necessary for an understanding of the present invention are illustrated, and it will be appreciated by any one of ordinary skill in the art that other elements necessary for performing other communication functions are also included at the Earth Station.

Figures 1, 2:
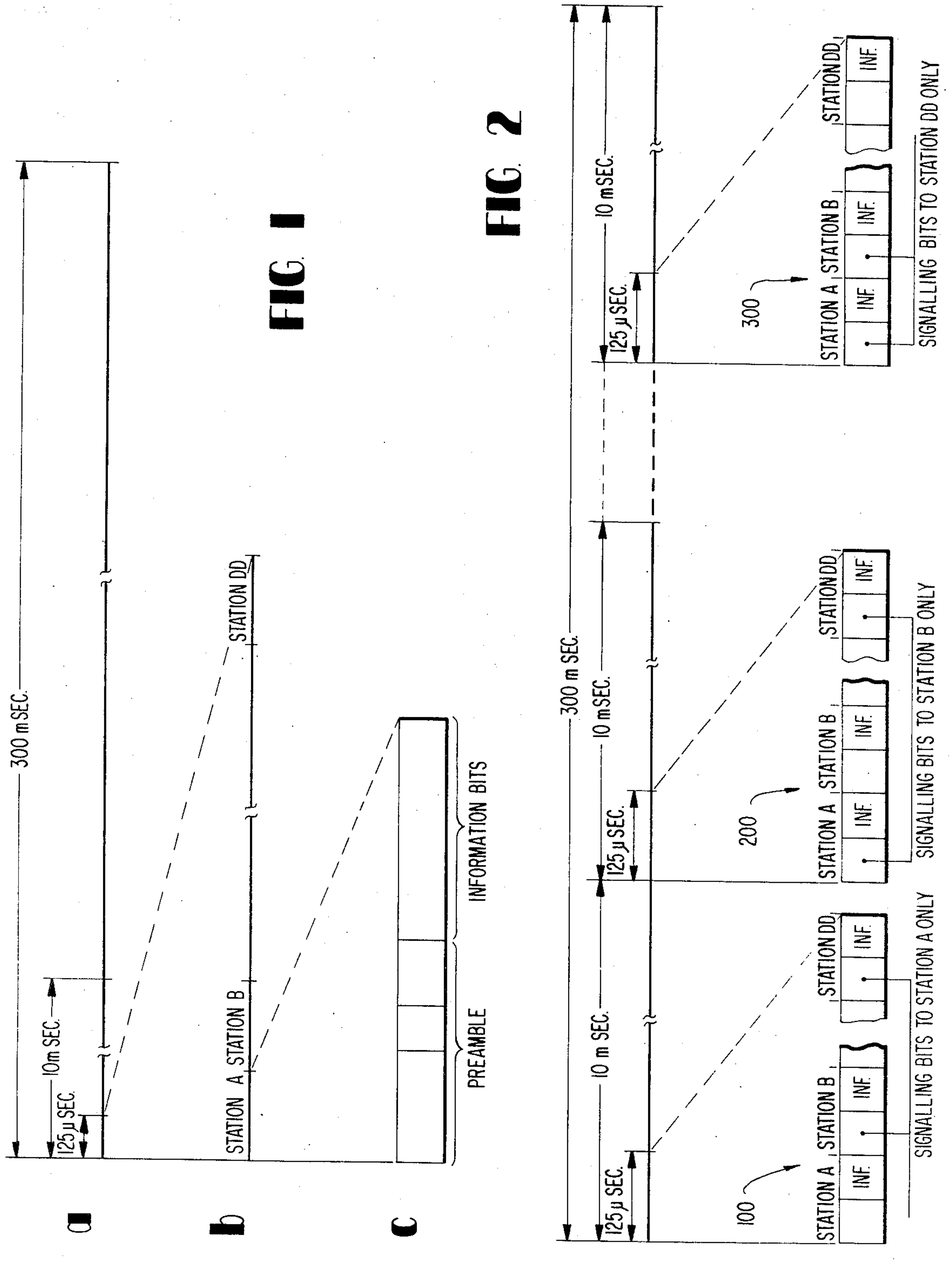
FIG. 1 illustrates the time relationship between individual stations bursts, a normal frame, and a super frame.
FIG. 2 illustrates the time relationship of the super frame and the master frames for time divided signalling operations.

Referring to FIG. 1, the relationship between the individual station bursts, a normal frame, and the super frame is illustrated. In the description it is assumed that there are 30 participating stations identified respectively as stations A through Z and AA through DD. The normal frame, comprising one burst from each of the participating stations, is 125 microseconds in duration, and the super frame is 300 milliseconds or 2400 normal frames. A typical burst format is illustrated in line C of FIG. 1 and comprises a preamble portion and an information portion. The information portion comprises the information to be communicated between subscribers, such as voice channel data, and the preamble portion includes the timing, station address codes (SAC), signalling bits, and other bits well known in the art. For the purpose of understanding the present invention, only the SAC and signalling portions of the preamble need be considered. When properly synchronized, the bursts from the participating stations arrive at the satellite, and thus also arrive at the receivers of the participating stations, in a sequence indicated in line B of FIG. 1. Each burst will include a SAC word in it's preamble identifying the transmitting stations. In the first frame of the 300 millisecond super frame each of the bursts will include a super frame marker in it's preamble indicating that the bursts are in the first frame of the super frame. It would be possible to transmit a super frame marker separate from the normal SAC words but a preferred technique is to transmit the complement of the normal SAC word thereby identifying both the transmitting station and the first frame of the super frame without the need for additional bits.

FIG. 2 illustrates the relationship between the 300 millisecond super frame and the master frames used for segregated signalling operations. The 300 millisecond super frame is divided into thirty 10 millisecond subdivisions or master frames, each comprising 80 normal frames. During the first master frame, the only signalling bits included in any of the burst preambles are those which are intended for station A. This is illustrated by the number 100 in FIG. 2. Formats 200 and 300 illustrate the signalling during master frames 2 and 30 respectively. Since the signalling is subdivided by designation, there is no need to transmit destination codes along with the signalling bits.

Referring now to FIGS. 3 through 5, it will be assumed that the apparatus shown is located at station C. The burst synchronization and frame synchronization portions are illustrated in FIG. 3, the transmit portion is illustrated in FIG. 4, and the receive portion is illustrated in FIG. 5. A few of the elements illustrated are shown in more than one figure for ease in following the detailed description. Where this occurs, the elements are given the same numeral in all figures to which they are common. The apparatus illustrated will first be described as it would operate in the prior art without frame synchronization and without the time divided destination signalling. Following that, the changes necessary to accomplish frame synchronization and time divided destination signalling will be described.

Referring first to FIG. 4, there is shown a preamble generator 48 and a channel information register 50 for storing, respectively, the preamble bits and the channel information bits which make up the station C burst. The generation and loading of the channel information bits into register 50 is state of the art and will not be described in detail herein. The same is true for the bits in the preamble. However, to provide a complete understanding of the present invention, it is noted that two portions of the preamble include the SAC word and signalling bits, respectively. The standard SAC word for the station C burst may be generated by a SAC word generator and entered into the proper slot of the preamble generator register 48 at a time prior to burst transmission under control of a burst transmit control means 46. The time during which signalling bits are entered into the proper slot of the preamble, generator register 48 will also be under control of the burst transmit control means 46. Typically, the signalling bits are derived from a signalling control unit 38 and, as they are generated, they are entered into the proper slot of the register 48 irrespective of the signalling destination. A destination code is therefore entered into the register 48 along with the signalling bits.

The burst transmit control means receives locally generated clock pulses at the bit rate and a burst start pulse from the burst synchronizer. The burst start pulse initiates preamble generator loading and burst transmission, and therefore the burst transmit time is controlled by the timing of the burst start pulse. Following the burst start pulse, clock pulses at the bit rate appear on output line 68 and operate to gate the signalling and SAC bits into the preamble generator. Subsequently, clock pulses at the bit rate appear on output line 70 to gate the contents of the preamble generator 48 out of the generator and through a burst combiner 52 to the transmitter modem circuitry wherein the bits modulate a carrier wave and the information is ultimately transmitted toward the satellite. Clock pulses at the bit rate appear on output line 72 immediately after the termination of the clock pulses on output line 70. The bit rate clock pulses on line 72 gate the channel information out of the channel information register 50 through burst combiner 52 to modem. The burst combiner 52 may be a simple OR circuit.

The timing of the burst start pulse and therefore the control of the burst transmit time is controlled by the burst synchronizer, illustrated in FIG. 3. In the receiver portion of station C, means are provided for detecting the SAC word of station A (which is the reference SAC) and the SAC word for station C (which is the local station SAC). The burst synchronizer comprises delay counter 12, comparator 14, reset decoder 18, and counter 20. The counter 20 receives the local clock pulses and recycles every 125 microseconds. Each time counter 20 recycles, a burst start pulse is generated. The delay counter 12 is loaded with a count corresponding to the assigned time difference between the reference burst and the station C burst in the frame format. As is well known, this time difference can be altered by entering a different number into the delay counter 12. When the reference SAC is detected, delay counter 12 begins counting down at the local clock rate and provides an output pulse when it reaches zero. The output pulse is applied as one input to the time comparator 14. The other input to time comparator 14 is the detected local station SAC. If the station C burst is properly synchronized, i.e. at the proper time position within the frame, the two input pulses to time comparator 14 will be in coincidence and there will be no output signal from the comparator. However, if the burst is not properly synchronized, there will be an output signal whose polarity indicates the direction that the station C burst should be moved to maintain synchronization. For example, a positive output may indicate that the station C burst is lagging behind its proper position and therefore should be advanced in time, whereas a negative output may indicate that the station C burst is ahead of its proper position and should be delayed in time. The decoder 18 responds to the error outputs from comparator 14 to either add or subtract a count from counter 20. The addition of one count to counter 20 will advance the burst start pulse an amount of time equal to one clock period. The subtraction of one count from counter 20 will have the opposite effect. In this manner the station C burst is maintained at the proper position within each frame.

On the receive side of station C, shown in FIG. 5, demodulation and detection circuitry illustrated generally by block 82 operate to demodulate the incoming signal, detect the SAC words, separate the channel information from the preamble, etc. The only functions necessary to an understanding of the present invention are those of separating out the signalling bits and providing separate bit timing for the received bursts from the respective stations. In the prior art system, the signalling bits intended only for station C are separated from all other signalling bits by a gating means which is responsive to the destination codes identifying station C. Following this, the extracted signalling bits are diverted to one of the registers 92 through 96 by means of the bit timing signals for the respective received bursts. The diversion of the extracted signalling bits into the proper registers 92 through 96 is typically carried out by a simple AND circuit of the type illustrated comprising AND gates 86 through 90. As will be apparent, there will be a register corresponding to register 92 for accepting signalling bits from each of the stations other than station C and there will be a corresponding AND gate, such as AND gate 86 for each of the registers. The signalling bits in the registers 92 through 96 are then applied to the signalling control units which operate in the conventional manner for controlling the local station signalling tasks.

The operation and apparatus described thus far is conventional for a TDMA (time division multiple access) satellite communications system.

The improvement includes a transmit side super frame counter which, as illustrated in FIG. 4, is divided into two parts, referred to as a frame counter 28 and a master counter 30, respectively. The transmit side super frame counter counts the burst start pulses and recycles every 2400 burst start pulses. Thus, the recycle time of the transmit side super frame counter is equal to the super frame duration. In the specific embodiment described the frame counter counts between 0 and 79 and each time the count goes from 79 back to 0 the frame counter provides an output pulse which is counted by master counter 30. The master counter thus keeps track of the thirty master frames and counts between 0 and 29. During the first frame of every superframe both the frame counter and master counter will register zero counts. The zero stage outputs from counters 28 and 30 are applied to AND gate 66 whose output in turn is applied as one of the inputs to the AND gate 56. A second input to AND gate 56 receives the bit timing pulses on line 68 from the burst transmit control means 46. As previously described, the latter bit timing pulses occur at the time the preamble generator 48 is to be loaded with the proper buts. The third input to AND gate 56 is from a super frame SAC generator or register 54. The latter register stores and generates the compliment of the station C SAC word. The output of AND gate 56 is connected to the slot of the preamble generator register 48 which normally contains the local station SAC word. Thus, as is apparent from the logic just described, during the first frame of each super frame, as determined by the transmit side super frame counter, the station C super frame SAC replaces the normal station C SAC in the preamble generator 48 and consequently the burst from station C at that time will contain the super frame marker.

Frame synchronization is achieved by detecting the reference station super frame SAC and the local station super frame SAC in the received signals, comparing the time of detection of the local and reference super frame SAC words to determine if the same frame, and altering the count of the transmit side super frame counter, when necessary, until the local and reference super frame SAC words occur in the same frame. The frame synchronizing logic for performing this operation is illustrated in FIG. 3. It will be noted that the transmit side super frame counter comprising frame counter 28 and master counter 30 is also illustrated in FIG. 3. The frame synchronization logic comprises flip flop circuits 100 and 106, AND circuits 102, 104, 108, 110, 114 and 116, and OR circuit 112. In general the frame synchronization logic operates as follows: When the local station super frame SAC and the reference station super frame SAC occur within the same frame, i.e. station C is properly frame synchronized, the frame counter 28 resets after every count of 79. Since the transmit side frame counter in the reference station also resets after every count of 79, station C will remain frame synchronized. However, if the station C super frame SAC does not appear in the same frame as the reference station super frame SAC. i.e. station C is not properly frame sychronized, the frame counter 28 is caused to reset after a count of 80 rather than after a count of 79. The frame counter 28 thus "slips" one frame per super frame relative to the transmit side frame counter in the reference station. This slippage continues until station C becomes properly frame synchronized, at which time frame counter 28 will again be reset after every count of 79.

Specifically, the logic controls the above described operation as follows: The pulse on line 118, representing the detection of the reference SAC, is applied to the reset input of flip flop 100, and the pulse on line 120, representing the detection of the reference super frame SAC, is applied to the set input of flip flop 100. Consequently, during the first frame of every super frame AND circuit 102 will be partially energized, and during all other frames of every super frame AND circuit 104 will be partially energized. If station C is properly frame synchronized the pulse on line 122, representing the detection of the station C super frame SAC, will occur during the first frame and will pass through AND circuit 102 and set flip flop 106. The latter flip flop will remain in the set condition as long as station C is properly synchronized. The set output from flip flop 106 partially energizes AND circuit 108, and when frame counter 28 reaches the count of 79, an output from AND circuit 108 will pass through OR circuit 112 and partially energize AND circuit 114. The inverted output from OR circuit 112 removes partial energization from AND circuit 116. When this condition occurs, the next burst start signal will pass through AND circuit 114 to reset counter 28. The output from stage 79 will be removed from AND circuit 108 and the succeeding burst start signals will pass through AND circuit 116 to advance counter 28.

If station C is not properly frame synchronized, the pulse on line 122 will occur during a frame other than the first frame and will pass through AND circuit 104 to reset flip flop 106. The remaining logic will operate as described above, except that AND circuit 110 and stage 80 of counter 28 will control the resetting of the frame counter.

The output of AND circuit 110 is also coupled to the set input of the flip flop 106. Thus, on a count of 80 in counter 28 flip flop 106 is set. Since flip flop 106 cannot reset until the following local super frame SAC the frame counter 28 "slip" can "slip" only one frame per super frame assuming the local super frame SAC does not appear in the same frame as the reference super frame SAC.

It is noted that the burst synchronizer shown in FIG. 3 further includes a pair of OR gates, 10 and 16. These OR gates are provided because the super frame SAC words and the normal SAC words are mutually exclusive. The apparatus illustrated in FIG. 3 further includes a receive side super frame counter comprising frame counter 34 and master counter of 36. The receive side super frame counter is identical to the transmit side super frame counter, except that the counter 34 is always reset after a count of 79, and operates to keep track of the number of the frame being received within the super frame. The receive side super frame counter is reset to a count of zero in response to a detection at the local station of the reference station super frame SAC word and thereafter advances one count in response to each detection of the reference station normal SAC word.

The receive side super frame counter, as shown partially in FIG. 5, operates to extract from all of the signalling bits on line 80 those particular signalling bits which are intended for local station C. This is accomplished by connecting the third stage of master counter 36 as one input to AND gate 84. Since all of the signalling bits intended for local station C are set during the third master frame of each super frame, when the receive side master counter 36 contains a count of two, it is known that all of the signalling bits on line 80 are intended for local station C. The latter signalling bits pass through AND gate 84 and are diverted to the respective registers 92 through 96 by the AND logic previously described.

The logic for controlling the transmission of the signalling bits is included in FIG. 4 and comprises AND circuits 60 through 64 and the OR circuit 58. The signalling bits, when derived in the signalling control until 38 are diverted to the proper signalling bit registers 40 through 44. Although only three signalling bit registers are illustrated, it will be apparent that there exists a separate signalling bit register to hold the bits which are destined for each of the respective stations. Also, there will be a corresponding number of AND gates although only three of them, 60 through 64, are illustrated in the drawing. Each of the AND gates is connected to one of the respective registers 40 through 44 and to one of the respective stages of the transmit side master counter 30. Each of the AND gates receives in common the clock pulses on line 68 which controls the entry of data into the preamble generator. The output of OR gate 58 is connected to the slot of preamble generator 48 which holds the signalling bits. Thus, as it is apparent from the logic illustrated, during the first master frame of the super frame only signalling bits intended for station A will be entered in the preamble generator; during the second master frame of the super frame only signalling bits intended for station B will be entered in the preamble generator; etc.

What is claimed is:

1. In a TDMA satellite communications system of the type in which participating station transmission bursts are transmitted toward a satellite on a time divided basis to align said bursts into repetitive frame formats, and wherein the participating stations receive said bursts in said frame format reradiated from said satellite, the improvement comprising, a. first means at each station for incorporating a super frame identification code in the station burst once every N station bursts, b. second means at each station responsive to the receipt of a burst from a reference station containing a super frame identification code and a burst from the local station containing a super frame identification code for synchronizing said first means to cause the super frame identification code to be included in the particular local station burst which aligns in the same frame with the burst from said reference station containing the super frame identification code.

2. A TDMA satellite communications system as claimed in claim 1 wherein said first means comprises, a transmit side super frame counter means for counting the burst transmitted, generator means for generating said super frame identification code, and means responsive to a predetermined count in said transmit side counter means for entering said code from said generator into the next burst transmitted from the local station.

3. The TDMA satellite communications system of claim 2 further including a plurality of signalling bit storage means each storing signalling bits destined to only one participating station, preamble generator means for generating a preamble to be transmitted with each burst and gate means, response to the count in said transmit side counter means for selectively entering signalling bits from said plurality of signalling bit storage means into said preamble generator means.

4. A TDMA satellite communications system as claimed in claim 2 wherein said means comprises, a. time comparator means responsive to the detection of said reference and local station super frame identification codes for generating an error output when said super frame identification codes occur in separate frames of the received signal, and b. means, connected between said time comparator and said transmit side super frame counter means responsive to said error output for altering the count in said transmit side super frame counter.

5. A TDMA satellite communications system as claimed in claim 4 wherein said transmit side super frame counter means comprises an $n$ count frame counter and a master counter stepped in response to a count of less than $n$ in said frame counter, said time comparator means comprising a first flip flop circuit assuming a first stable state in response to a received reference station super frame identification code and a second stable state in response to a received reference station frame identification code other than a super frame identification code, and a first coincidence gate circuit enabled in response to said first flip flop circuit assuming its second stable state and receiving signals indicative of the arrival of the local station super frame identification code for generating an error output in response to said reference station and local station super frame identification codes appearing in separate frames.

6. A TDMA satellite communications system as claimed in claim 5 wherein said means for altering the count in said transmit side super frame counter means comprises a second flip flop circuit assuming a first stable state in response to said error output, a second coincidence gate circuit enabled in response to said second flip flop circuit among its first stable state, an input to said second gate circuit being coupled to the n-th stage of said frame counter and frame counter reset means means responsive to the output from said second gate circuit for resetting said frame counter after a count of $n$.

7. A TDMA satellite communications system as claimed in claim 6 wherein said time comparator means further includes means responsive to the detection of reference and local station super frame identification codes for generating an in-sync output when said super frame identification codes occur in the same frame of said means for generating said in-sync output comprising a third coincidence gate (102) enabled in response to first flip flop circuit assuming its first stable state and receiving a signal indicative of the arrival of local station super frame identification code, whereby said third coincidence gate means produces an in-sync signal in response to the occurrence of a reference station super frame identification code and a local station identification code in the same frame.

8. A TDMA satellite communications system as claimed in claim 7 wherein said second flip flop circuit assumes a second stable state in response to an in-sync signal, said means for altering further including a fourth coincidence gate circuit enabled in response to said second flip flop circuit assuming its second stable state, an input of said fourth gate circuit being coupled to the $n-1$ stage of said frame counter, said reset means being responsive to the output of said fourth gate circuit to reset said frame counter after $n-1$ counts in response to an in-sync output.

9. A TDMA satellite communications system as claimed in claim 2 wherein each station further includes receive side super frame counter means, means for separating signalling bits from received signals, a plurality of received signalling bit storage means each for storing signalling bits from only one participating station, and means responsive to a preselected count in said receive side counter means for applying receive signalling bits to said plurality of storage means.

10. A TDMA satellite communications system as claimed in claimed 9 wherein said transmit side super frame counter means comprises a $n+x$ stage frame counter and an $N_m$ stage master counter wherein $N_m$ equals the number of participating stations, $n = N/N_m$ and $x$ equals a preselected additional number of stage and wherein said receive side super frame counter means comprises an $n$ stage frame counter and an $N_m$ stage master counter.

* * * * *

UNITED STATES PATENT OFFICE

CERTIFICATE OF CORRECTION

Patent No. 3,772,475 Dated November 13, 1973

Inventor(s) Albert LOFFREDA

It is certified that error appears in the above-identified patent and that said Letters Patent are hereby corrected as shown below:

Column 6, line 2 - Before "decoder" insert -- reset -- line 63 - After "proper" delete "buts" and substitute -- bits --

Column 8, line 50 - After "control" delete "until" and substitute -- unit --

Signed and sealed this 16th day of July 1974.

(SEAL)
Attest:

McCOY M. GIBSON, JR.
Attesting Officer

C. MARSHALL DANN
Commissioner of Patents